United States Patent
Peterson

[15] 3,706,663
[45] Dec. 19, 1972

[54] METHOD OF CONTROLLING ODOR

[72] Inventor: Oliver H. Peterson, Charles City, Iowa

[73] Assignee: Salsbury Laboratories, Charles City, Iowa

[22] Filed: Feb. 25, 1971

[21] Appl. No.: 119,060

[52] U.S. Cl. .......................... 210/64, 21/55, 424/76
[51] Int. Cl. ............................................. C02b 3/06
[58] Field of Search .......... 21/55; 71/3; 210/1, 2, 64; 260/397.6, 397.7, 708; 424/76

[56] References Cited

UNITED STATES PATENTS

| | | | |
|---|---|---|---|
| 2,546,898 | 3/1951 | Mark | 424/76 X |
| 2,893,958 | 7/1959 | Phillips | 424/76 |
| 3,413,218 | 11/1968 | Einsel | 21/55 X |
| 3,509,254 | 4/1970 | Krotinger et al. | 21/55 X |
| 2,481,105 | 9/1949 | Goedrich | 260/397.7 X |
| 2,366,742 | 1/1945 | Martin et al. | 260/397.7 |

Primary Examiner—Reuben Friedman
Assistant Examiner—Thomas G. Wyse
Attorney—Henderson & Strom

[57] ABSTRACT

A method of controlling the odors emanating from large bodies of animal waste such as are found in feedlots and in the sumps of animal houses. The animal waste is treated with a compound capable of selectively inhibiting the formation of malodorous compounds which normally result from the natural decomposition of the animal waste. Preferred compounds are the sulfa drugs, and sulfaguanidine has been found to be particularly useful. The compound is typically applied as a solid mixed with an inert diluent when used on a feedlot, and as an acid solution when used to treat the sewage in the sump of an animal house.

12 Claims, No Drawings

METHOD OF CONTROLLING ODOR

BACKGROUND OF THE INVENTION

There has been a trend in recent years toward the use of feedlots and similar high concentration facilities in livestock production. This trend is a result of several factors, including increased technology in the livestock industry, increased population and resulting decrease in available land for agricultural purposes, and economic considerations. A major problem associated with high density type livestock operations is that of animal waste odors. The animals, often as many as 100 or more, are confined in a limited pen or shelter house, and the body wastes from the animals accumulate either on the ground in the case of a feedlot, or in a sump in the case of a shelter house, periodically the animal waste is removed and spread as a fertilizer. The orders emanating from these accumulating wastes are quite strong, and generally considered highly objectionable.

While it is generally difficult to quantify a property such as an odor, it is nevertheless quite easy to recognize the objectionable characteristics of the odors around a feedlot or animal house.

Very little has been accomplished in the prior art toward eliminating or minimizing this problem. About the only solution that has heretofore been available is to locate the animals such that the prevailing wind will carry the odors away from the populated locations. Other than this, good housekeeping practices and proper ventilation have been about the only means available to minimize the odor problem.

SUMMARY OF THE INVENTION

This invention relates to a method of controlling the odor of a large volume of animal waste products, and more particularly to treatment of the waste products with compounds which selectively inhibit the formation of malodorous compounds which result from the normal decomposition of the animal waste.

The odors in animal waste are produced by compounds formed from microbial action on organic compounds present therein. In particular, low molecular weight nitrogen containing compounds, such as the skatoles and indoles, and sulfur containing compounds such as the mercaptans, are produced from microbial degradation of protein and other material present in the animal waste. This invention provides a method of controlling the formation of these malodorous products by treating the waste with a compound which will selectively inhibit undersirable types of microbial decomposition. However, it is not desirable to sterilize the waste material, as it is generally used as a fertilizer, and it is an object of this invention to selectively inhibit the formation of the malodorous compounds while allowing the microbial flora to otherwise proceed with the normal decomposition of the waste material such that it can still be useful as a fertilizer.

One criterion in selecting a compound for this purpose is that it not be phytotoxic, and that it not be detrimental to the fertilizer properties of the waste material.

According to this invention, sulfa drugs, which are sometimes referred to as sulfonamides, are used to treat animal waste to inhibit selectively the formation of malodorous compounds, while allowing the normal decomposition of the animal waste to otherwise proceed. A particularly effective compound is sulfaguanidine.

The compounds can be applied in any suitable manner, but typically would be added as a solid in an inert diluent, in cases where an animal feedlot is being treated. When the animal waste is in a sump, for example, under a shelter or house containing a large number of animals, the compounds are conveniently added as a liquid. Usually, acid solutions of the compounds are preferred, due to the fact that the animal waste is generally alkaline and it is not desired to increase the alkalinity thereof. Both inorganic and organic acids, such as hydrochloric, sulfuric, phosphoric and acetic acids, are useful in forming solutions of the compounds. However, in some cases it is desirable to add the compounds as salts in basic solutions. In treating liquid or semi-liquid waste in a sump, the liquid solution may be added at various points or agitation may be used to effect distribution thereof throughout the body of waste material.

DESCRIPTION OF THE PREFERRED EMBODIMENTS

Preferred compounds for use in this invention are the class of synthetic organic drugs related chemically to sulfanilamide, and often referred to as sulfa drugs. These drugs act destructively on certain types of bacteria.

The sulfa drugs, or sulfonamides, may be described generically as having the formula

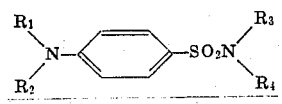

where $R_1$, $R_2$, $R_3$ and $R_4$ may be hydrogen, acetyl, lower alkyl,

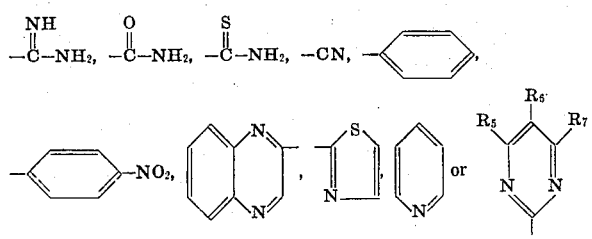

where $R_5$, $R_6$ and $R_7$ may be hydrogen, lower alkyl or lower alkoxy.

Examples of specific compounds falling within the above general formula are sulfaguanidine, sulfanilamide, $N^1$-acetyl-(paranitrophenyl)-sulfanilamide (sulfanitran), $N^1$-phenyl sulfanylamide (sulfabenz) and sulfacetamide. Other compounds which are included in the above generic description, but which would probably be less desirable because of economic considerations, include sulfanilylurea, cyanosulfanilamide, sulfathiazole, sulfathiourea, sulfamerazine, sulfamethazine, sulfaquinoxaline, and sulfapyridine.

Broadly, it is contemplated by this invention that any of the sulfonamides generally considered to be of the family of compounds known as sulfa drugs may be utilized. Also, it is understood that the various forms of these compounds, such as the hydrates or the sodium, potassium and ammonium salts, and acid salts, are in most cases equivalent to the compounds per se for purposes of this invention. Other salts, such as the lithium salts for example, are not desirable due to the phytotoxic properties of lithium.

Sulfaguanidine, which has the formula

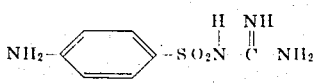

has been found to be particularly useful, as it has drastically reduced the offensive odors emanating from animal waste when used in accordance with the invention. Also, the sulfaguanidine is quite stable and does not decompose rapidly, so that it is effective over a prolonged period of time. Also, sulfaguanidine has been found to be non-phytotoxic, so that the animal waste which has been treated with sulfaguanidine can be safely and effectively used as a fertilizer. Sulfaguanidine in its various commercially available forms is suitable for the process.

The following examples illustrate the effectiveness of these compounds in reducing the odor from animal waste.

EXAMPLE I

The manure sumps under four separate swine houses were treated with a sulfaguanidine hydrochloride solution comprising about 6 percent sulfaguanidine, 3 percent hydrochloric acid (37 percent) and about 91 percent water. The solution was distributed throughout the contents of the manure sumps in an amount sufficient to provide 5 parts per million sulfaguanidine. The owners of each of the swine houses stated that the odor has been significantly reduced as a result of the treatment, and in one case the owner stated that the sump had no odor. While odor is a very difficult property to accurately measure, there was no question but what the sulfaguanidine treatment substantially reduced the objectionable odor from the treated manure sumps.

Since manure sumps are periodically emptied and the contents spread as a fertilizer, it is desirable to periodically add additional treating material to the manure sumps, such as after each evacuation and cleaning of the sumps. There should be at least 1 part per million sulfaguanidine present, and preferably about 5 or more parts per million. The sump contents can be tested for sulfaguanidine level, and periodic additions can be made between sump cleanings if necessary to maintain the effective inhibiting level therein.

EXAMPLE II

Four pens of a cattle feedlot were treated with a mixture of sulfaguanidine and ground corn germ meal at a level of 10 pounds per acre of sulfaguanidine. The odor in all four pens was substantially reduced. Subsequent applications of additional sulfaguanidine-containing material resulted in a continued low level of objectionable odor from the treated pens as compared to untreated pens.

The sulfaguanidine applied to feed pens is most conveniently in the form of a solid mixed with an inert diluent which can be ground gain, sand, clay or other suitable inert carrier. A 10 percent by weight sulfaguanidine content is satisfactory, and the material can be added so as to provide at least one pound per acre, and preferably about 10 pounds per acre of sulfaguanidine.

EXAMPLE III

The ppm sulfanilamide is added to a swine manure sump, and additional sulfanilamide is periodically added to the sump to maintain a level of at least 5 ppm. The odor from the manure sump is found to be substantially reduced.

EXAMPLE IV $N^1$-acetyl-(para-nitrophenyl)-sulfanilamide is added as a solid in an inert diluent to feedlot pen in an amount such that 3 pounds per acre of $N^1$-acetyl-(para-nitrophenyl)-sulfanilamide is present. Additional material is added periodically to maintain an effective amount in the animal waste in the pen. The odor from the pen is found to be substantially reduced.

EXAMPLE V

Sulfacetamide is added to a feedlot pen containing cattle. The material is added at a level of 10 pounds per acre active ingredient, mixed with an inert diluent. The odor from the feedlot pen is found to be substantially reduced.

EXAMPLE VI

A basic solution of sulfabenz in aqueous sodium hydroxide is added to a manure sump in an amount sufficient to provide 10 ppm sulfabenz in the sump. The amount of sulfabenz is monitored and maintained above 5 ppm for a substantial period of time. The odor from the sump is found to be substantially reduced.

While the exact reason for the reduction in objectionable odors resulting from treatment of animal waste with the compounds according to this invention is not definitely known, it is thought that the reduction in objectionable odor is due to the selective inhibition of formation of low molecular weight nitrogen and sulfur-containing malodorous compounds which normally result from the decomposition of animal waste. In any event, the odor from animal waste has been found to be substantially reduced or eliminated by treatment in accordance with this invention.

While specific examples have been described to illustrate this invention, it will be obvious that other compounds related to those recited in the examples could be utilized in the practice of this invention, and should be considered as being within the scope of this invention as defined by the claims.

I claim:

1. The method of controlling the odor of animal waste comprising treating the animal waste with an effective amount of a sulfonamide.

2. The method of claim 1 wherein the sulfonamide is of the formula

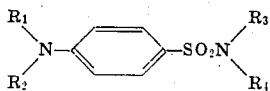

in which $R_1$, $R_2$, $R_3$ and $R_4$ are selected from the group consisting of hydrogen, acetyl, lower alkyl,

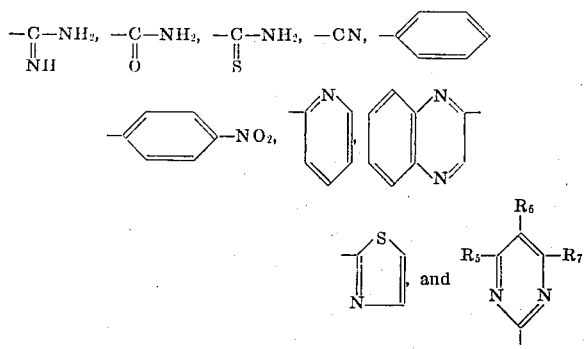

where $R_5$, $R_6$, and $R_7$ may be hydrogen, lower alkyl or lower alkoxy.

3. The method of claim 2 wherein the sulfonamide is sulfaguanidine.

4. The method of claim 2 wherein the sulfonamide is sulfacetamide.

5. The method of claim 2 wherein the sulfonamide is sulfanilamide.

6. The method of claim 2 wherein the sulfonamide is sulfanitran.

7. The method of claim 2 wherein the sulfonamide is sulfabenz.

8. The method of claim 1 wherein the animal waste being treated is in an animal feedlot.

9. The method of claim 1 wherein the animal waste being treated is in the sewage sump of an animal house.

10. The method of claim 8 wherein the feedlot is treated with at least one pound per acre of sulfaguanidine, the sulfaguanidine being applied with from one to twenty parts of an inert carrier per part of sulfaguanidine.

11. The method of claim 9 wherein the sewage sump is treated with an acidic solution of sulfaguanidine in an amount such that at least one part by weight of sulfaguanidine is present for each one million parts by weight of material in the sewage sump.

12. The method of claim 11 wherein the sewage sump is treated periodically such that the level of sulfaguanidine present is maintained above one part per million over an extended time period.

* * * * *